Figure 1:
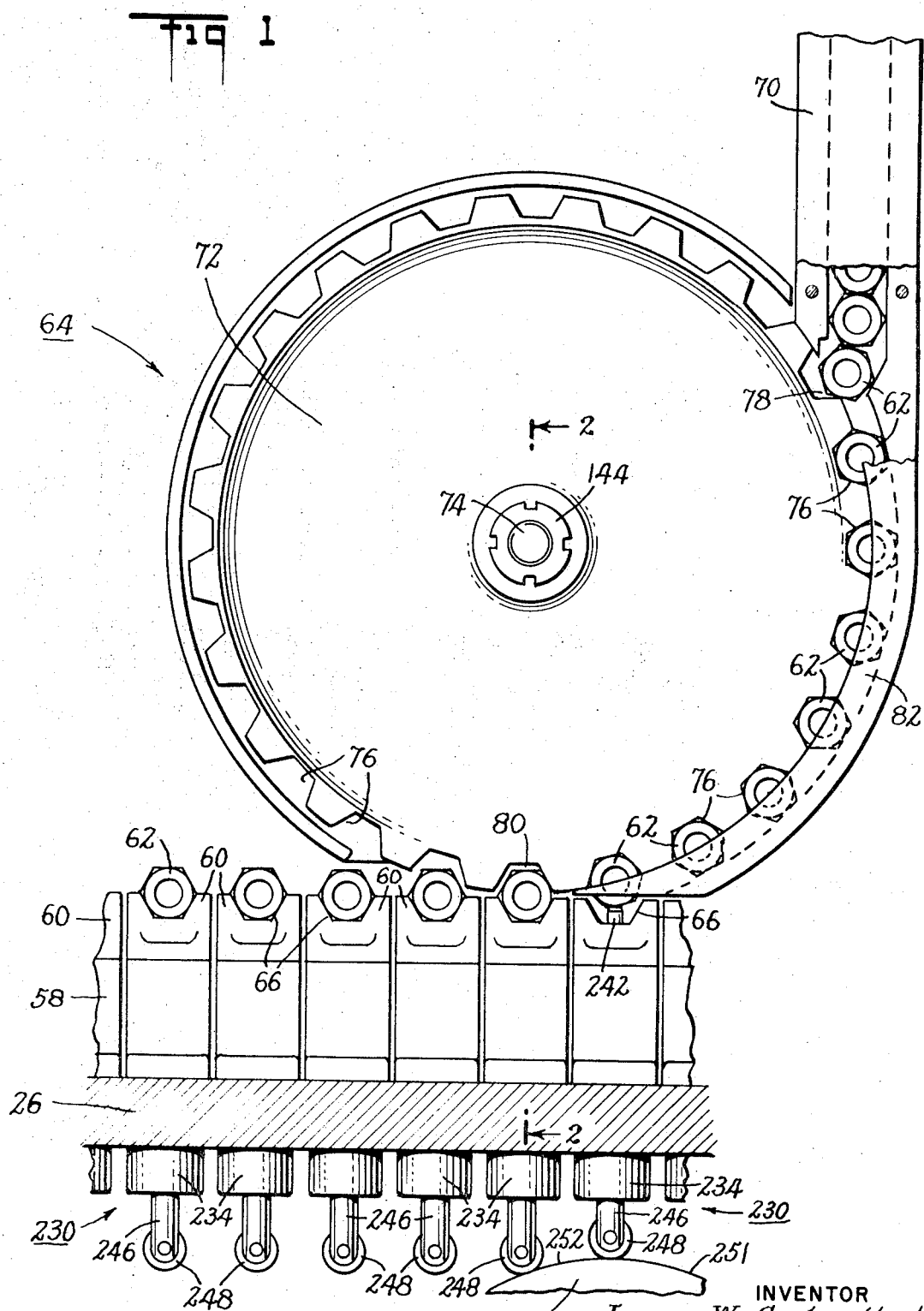

United States Patent

[11] 3,565,232

| [72] | Inventor | James W. Cadwallader |
| | | Lansdale, Pa. |
| [21] | Appl. No. | 746,636 |
| [22] | Filed | July 22, 1968 |
| [45] | Patented | Feb. 23, 1971 |
| [73] | Assignee | Standard Pressed Steel Co. |
| | | Jenkintown, Pa. |

[54] ARTICLE FEEDING MECHANISM
5 Claims, 2 Drawing Figs.

[52] U.S. Cl. ................................................ 198/25,
198/103
[51] Int. Cl. .................................................. B65g 37/00,
B65g 47/04
[50] Field of Search .......................................... 198/25-
—26, 62, 103; 221/266, (Inquired); 10/169,
(Inquired)

[56] References Cited
UNITED STATES PATENTS

| 1,501,766 | 7/1924 | Furlan ........................ | 221/266 |
| 2,152,107 | 3/1939 | Thompson ................... | 198/25 |
| 2,393,961 | 2/1946 | Almgren ...................... | 198/25X |

Primary Examiner—Edward A. Sroka
Attorneys—Stanley Belsky and Curtis, Morris & Safford ABSTRACT: A rotatably mounted transfer wheel having article holding indentations around its perimeter is positioned to pick up an article, such as a nut, from a stack and, as the wheel rotates, unintermittedly transport the nuts to a continuously moving nut receiving member where the nuts are then deposited serially.

3,565,232

ARTICLE FEEDING MECHANISM

This invention pertains to article feeding mechanisms and more in particular to unintermitted article feeding mechanisms for transferring articles, such as nuts, from a stacked, stored position to a continuously moving conveyor element.

In various manufacturing techniques it is often necessary to transfer an article, such as a nut, from a stored area to an automatically and continuously moving assembly line operation. In order to maintain continuity in the manufacturing sequence and, also, to transfer the articles in the most economical and rapid manner, it is desirable to have an article feeding mechanism which can operate unintermittedly in order to transfer the article in a precise and rapid manner from a stored position, to, for example, a continuously moving conveyor, where a subsequent manufacturing operation is to be carried out.

It is therefore an object of the present invention to provide an article transfer mechanism which can operate continuously without interruption to transfer articles from one point to a receiving member which is also moving continuously. It is a further object of this invention to provide an article feeding mechanism which can feed a large number of articles in a rapid and expedious manner to a continuously moving receiving member with a minimum possibility of error or malfunction. A still further object of this invention is to provide an article feeding mechanism which can be readily adjusted and adapted to feed articles of different sizes.

Figure 2:
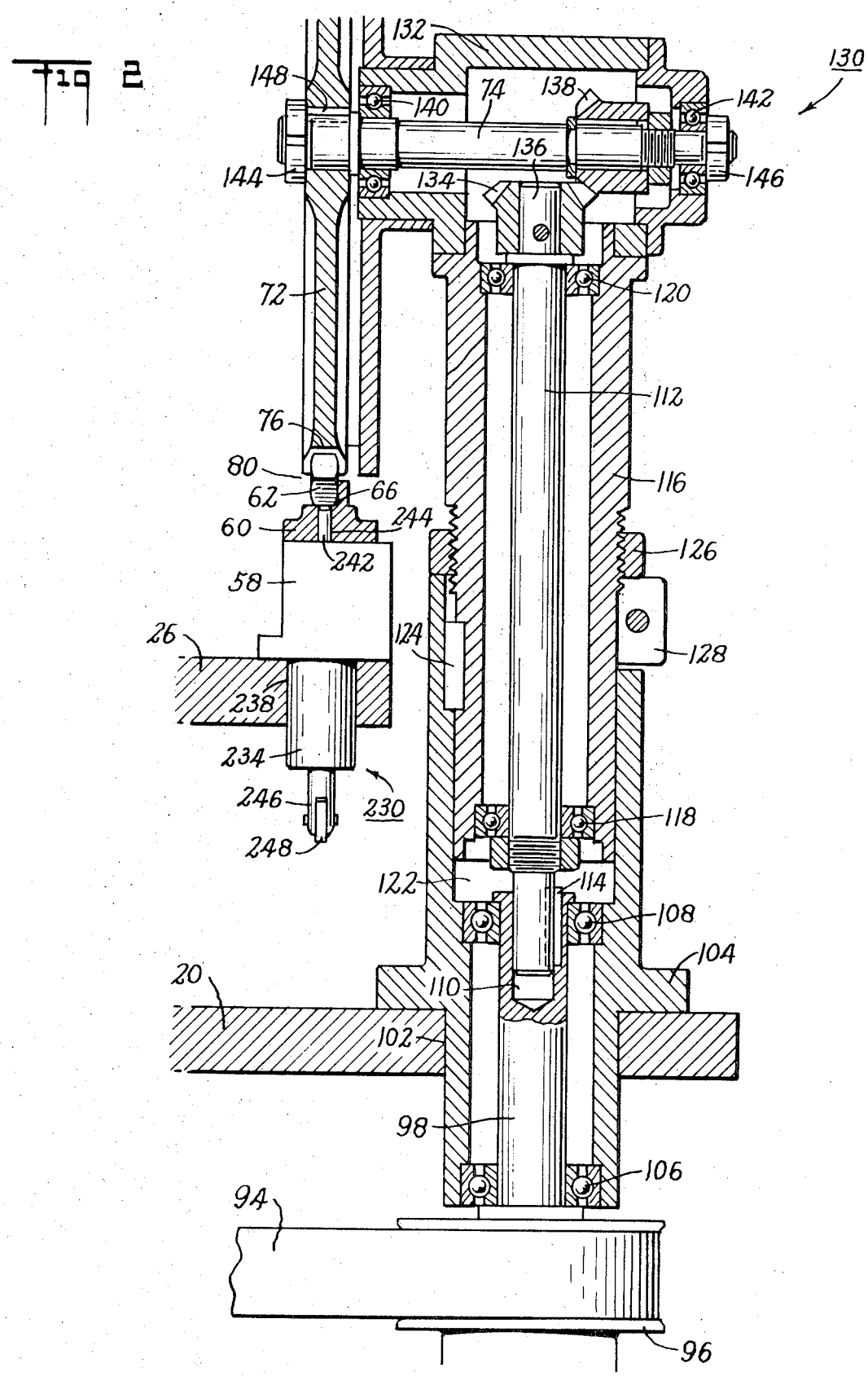

In the Drawing:

FIG. 1 is an elevational view partly in section showing the apparatus of the present invention; and FIG. 2 is an enlarged vertical section taken on line 2—2 of FIG. 1.

At the outset it is to be understood that while the invention will be described herein illustratively as a nut feeding mechanism, any number of articles such as studs, bolts, spring pins, and the like may also be used, it being necessary only to alter the configuration of the article retaining troughs in order to accommodate articles of different size or shape. With this in mind and with reference to FIG. 1, it is seen that nuts 62 are continuously fed by means of the nut feed assembly 64 to a retaining tray fixed to a support 58 on a continuously rotating table support member 26. The support member 26 could also be a continuously moving linear conveyor. The nuts may be stored in a vibratory hopper feed unit (not shown) and are fed by gravity through a vertically disposed delivery chute 70 to a point 78 above the horizontal centerline of rotating nut feed wheel 72.

The nut feed wheel or starwheel 72 is fixed to a rotatably mounted shaft 74 and includes a plurality of troughs 76 spaced around its periphery. The shape of each trough 76 is contoured to conform to the shape of the nuts—for example half-hexagonal shaped to enable starwheel 72 to engage, pick up and transfer hexagonal nuts 62 as the wheel 72 rotates. The nuts are picked up at 78, at the lower end of the stack of nuts in the delivery chute 70, and are carried around to the retaining tray 60 where they are deposited, as at 80, into a corresponding trough 66 in tray 60. The shape of each trough 66 is similarly contoured to conform to the shape of the nuts in order to receive and retain the nuts. An arcuate guard segment 82 retains the nuts in the starwheel as they are transferred from pickup point 78 to delivery point 80.

The rotation of starwheel 72 is synchronized with the rotation of table support 26 so that the troughs 76 in starwheel 72 register with troughs 66 as troughs 66 are moved past the delivery point 80.

With reference to FIG. 2, the drive for the nut feed assembly 64 is obtained from a motor (not shown) which drives a belt 94 to rotate a pulley 96 fixed to the main drive shaft 98 of the nut feed assembly 64.

The nut feed assembly 64 is supported by a cylindrical housing 100 extending through a stationary support member 20, as at 102, and is supported on stationary support 20 by flanged extension 104. Shaft 98 is supported within housing 100 by bearing members 106 and 108, so as to be freely rotatable therein, and includes an axial bore 110 in its upper end to receive the lower end of secondary drive shaft 112. Shaft 112 is fixed to shaft 98 by a key 114 so that it rotates with shaft 98 and is rotatably supported within a housing 116 by bearings 118 and 120. Housing 116 is dimensioned to fit within an annular space 122 between housing 100 and shaft 98 and is fixed to housing 100 by a key 124 to preclude relative rotation between the housings. The vertical position of housing 116 and shaft 112, relative to housing 100 and shaft 98, is adjustable by means of a geared adjustment means 126 and position lock 128. This feature of adjustability allows the nut feed assembly 64 to be vertically adjusted to accommodate nuts or other articles of different sizes without necessitating major structural changes of the basic drive mechanisms and supports.

Thus, in order to adapt the feed mechanism to accommodate either nuts of different sizes or another article, it is only necessary to change the starwheel 72 and retaining tray 60 to ones having troughs suitably contoured to retain the article. Also, if necessary, the elevation of the starwheel above the retaining tray is adjusted in order to obtain proper registry of the mating troughs when the article is transferred from the starwheel to the tray.

At the top of housing 116 is a drive transfer assembly 130 mounted in a housing 132. The drive transfer assembly 130 includes a helical gear 134, mounted on a shoulder extension 136 of shaft 112, which meshes with a helical gear 138 mounted on the starwheel drive shaft 74. Shaft 74 is supported within housing 132 by bearings 140 and 142 and is secured against axial displacement by end stop nuts 144 and 146. The starwheel 72 is fixed to driving shaft 74 by a key 148 and thus is rotated when shaft 74 is rotated through the drive transfer assembly 130 as a result of the rotation imparted through belt 94 and pulley 96.

Associated with each nut receiving trough 66 is a spring actuated plunger mechanism 230 (FIG. 2). Plunger mechanism 230 includes a barrel housing 234 which is fixed in a bore 238 in the support member 26 and a plunger rod 242 mounted in barrel 234 with one end extending through a bore 244 in tray 60 into the trough 66. The other end of rod 242 includes a bifurcated portion 246 in which is rotatably mounted a roller 248. The rod is biased by a spring (not shown) so that the normal rest position is one where the top of rod 242 is below the bottom of trough 66.

The plunger rod 242 is elevated during the nut feed operation by a fixed cam guide section 250 (FIG. 1) including a lead-in portion 251 and a lead-out portion 252. As the rotating support member 26 moves past the fixed cam guide 250, roller 248 contacts and rides up the lead-in portion 251 and urges rod 242 upward against its internal spring bias. The cam guide 250 is positioned relative to the nut feed assembly 64 so that rod 242 is elevated within a trough 66 when that trough, during rotation of support member 26, approaches the nut transfer point 80 so that, as a nut 62 is brought into register with that trough 66, the rod 242 holds the nut within a trough 76 on starwheel 72 until the nut is directly over the transfer point 80. This prevents the nut from tumbling which could result in nut misalignment during the transfer of the nut into trough 66. Cam guide 250 is a relatively short section and the lead-out portion 252 allows plunger 242 to retract, under spring urging, just before transfer point 80 is reached. The nuts 62 are thus transferred smoothly under positive control at all times.

It is thus seen that the present invention provides an apparatus for transferring articles from an article storage means to a moving article conveying means in a smooth continuous operation. Positive control on the article is maintained thus avoiding the problem of jamming and/or malfunction in the transfer process and permitting high speed use particularly adaptable to continuous production line applications.

I claim:

1. An article feeding and transfer mechanism to transfer articles from a storage area to a continuously moving conveying member in an unintermitted manner comprising:

a rotatably mounted transfer wheel having a plurality of article holding indentations around its periphery adapted to retain an article therein, storage means for said articles adjacent said transfer wheel adapted to store a plurality of articles therein and positioned such that upon rotation of said transfer wheel single ones of said stored articles are brought into contract with an indentation on said transfer wheel and are retained therein there to be transferred as said wheel is rotated to a delivery point arcuately spaced from said pickup point to be deposited on a moving article conveying member, said moving article conveying member including an article retaining member thereon having a plurality of spaced article receiving indentations, said indentations having an internal contour to mate with the external contour of said articles thereby to snugly retain said articles therein, said indentations on said article retaining member being spaced thereby to register with said article holding indentations on said transfer wheel when said transfer wheel is rotating and said article conveying member is moving; each said indentation in said article retaining member including a bore therein adapted to slidably receive a rod element therethrough, said rod element selectively movable from a first lower position wherein one end of said rod is below the bottom surface of said indentation to a second raised position wherein said rod element is exposed within said indentation, each said rod being adapted to move from said first position to said second position immediately prior to the transfer of an article from said transfer wheel to said article retaining member and thence to return to said first position after transfer has been completed thereby to positively control said article during said transfer.

2. Apparatus as defined in claim 1 wherein the other end of said rod includes a roller element rotatably mounted thereon, a fixed cam guide section having an upwardly inclined lead-in section and a downwardly inclined lead-out section whereby said roller element contacts said cam guide section and rolls up said lead-in section thereby causing said rod element to move from said first position to said second position and thence rolls down said leadout section causing said rod element to move from said second position to said first position.

3. In combination, a continuously moving article conveying member adapted to transport a plurality of aligned articles, a transfer mechanism adapted to serially transfer a plurality of articles from a supply of stored articles to said article conveying member in an unintermitted manner, said transfer mechanism including a rotatably mounted transfer wheel having article retaining indentations circumferentially spaced thereon, storage means adjacent said transfer wheel for storing articles to be transferred in linear alignment, means to urge said stored articles toward said transfer wheel whereby as said transfer wheel is rotated single ones of said aligned articles are serially engaged and retained by successive ones of said article retaining indentations on said transfer wheel and transported by said transfer wheel to a deliver point where they are serially deposited on said article conveying member, said article conveying member including an article retaining member having spaced indentations thereon to retain said articles therein, said indentations on said article retaining member being spaced to register with said indentations on said transfer wheel at said delivery point thereby to effectuate a smooth transfer of articles from said transfer wheel to said article conveying member, said transfer wheel being mounted to rotate on a horizontal axis and the linear axis of alignment of said stored articles intersecting said transfer wheel at its periphery at a point above the horizontal centerline of said wheel and wherein said article conveying member is positioned below said transfer wheel and substantially coplanar therewith whereby articles to be transferred are picked up from said storage means and carried by said transfer wheel to a delivery point substantially along the vertical centerline of said wheel, each said indentation on said article retaining member including a bore therein to slidably receive a plunger element, means associated with said article conveying member to elevate said plunger element within said bore prior to an article being transferred to said article conveying member thereby to hold said article being transferred within said transfer wheel until both the indentation in said transfer wheel and in said article retaining member are in registry at said delivery point wherein said plunger element is retracted allowing said article being transferred to seat within said indentation in said article retaining member.

4. An article feeding and transfer mechanism to transfer articles from a storage area to a continuously moving conveying member in an unintermitted manner comprising:

a rotatably mounted transfer wheel having a plurality of article holding indentations around its periphery adapted to retain an article therein, storage means for said articles adjacent said transfer wheel adapted to store a plurality of articles therein and positioned such that upon rotation of said transfer wheel single ones of said stored articles are brought into contract with an indentation on said transfer wheel and are retained therein there to be transferred as said wheel is rotated to a delivery point arcuately spaced from said pickup point to be deposited on a moving article conveying member, said moving article conveying member including a plurality of spaced article receiving indentations, each of said indentations having a support member movable from a first position to a second position, said second position being closer to said transfer wheel then said first position, and means for moving said support member from said first position to said second position immediately prior to the transfer of an article from said transfer wheel to said article retaining member and thence to return to said first position after transfer has been completed thereby to positively control said article during said transfer.

5. In combination, a continuously moving article conveying member adapted to transport a plurality of aligned articles a transfer mechanism adapted to serially transfer a plurality of articles from a supply of stored articles to said article conveying member in an unintermitted manner, said transfer mechanism including a rotatably mounted transfer wheel having article retaining indentations circumferentially spaced thereon, storage means adjacent said transfer wheel for storing articles to be transferred in linear alignment, means to urge said stored articles toward said transfer wheel whereby as said transfer wheel is rotated, single ones of said aligned articles are serially engaged and retained by successive ones of said article retaining indentations on said transfer wheel and transported by said transfer wheel to a delivery point where they are serially deposited on said article conveying member, said transfer wheel being mounted on a shaft spaced from said article conveying member, means for altering the position of said shaft toward and away from said article conveying member so that said article retaining indentations on said transfer wheel are moveable relative to said article conveying member thereby to accommodate articles of different sizes, said means for altering the position of said shaft comprising a driving mechanism connected to said shaft, said driving mechanism including a shaft member moveable toward and away from said article conveying member.